F. BANKS.
GEARING FOR AUTOMOBILES.
APPLICATION FILED MAY 2, 1916.

1,225,102.  Patented May 8, 1917.

Inventor
F. Banks.
By
Attorneys

UNITED STATES PATENT OFFICE.

FRANK BANKS, OF HIBBING, MINNESOTA.

GEARING FOR AUTOMOBILES.

1,225,102. Specification of Letters Patent. Patented May 8, 1917.

Application filed May 2, 1916. Serial No. 94,938.

*To all whom it may concern:*

Be it known that I, FRANK BANKS, a citizen of the United States, residing at Hibbing, in the county of St. Louis and State of Minnesota, have invented certain new and useful Improvements in Gearing for Automobiles, of which the following is a specification.

My invention relates to new and useful improvements in gearing, the primary object of my invention being the provision of a novel form of gearing particularly intended for use in connection with automobiles and adapted to permit a greater range of gear ratios in the transmission of power between the engine and rear axle.

A still further object of my invention consists in the provision of a gearing of the above described type which shall be installed in addition to the ordinary change speed transmission gearing and which may be set to either increase the gear ratio or decrease it, as desired.

In many instances, the gear ratios or settings of automobiles, as they are put upon the market, are such as to render the automobiles of little use for certain special purposes, such as trucking and the like where a relatively low gear ratio is desired. Again, the standard gear ratios of automobiles intended primarily for trucking purposes are usually so low as to almost prohibit the use of the automobiles, when desired, for ordinary driving purposes. My invention specifically resides in the provision of a gearing mechanism including co-acting gears adapted to be carried by drive shaft sections and capable of interchangement from one section to the other to either step up or step down the gear ratio of the transmission.

With these and other objects in view, my invention will be more fully described, illustrated in the accompanying drawings, and then specifically pointed out in the claims which are attached to and form a part of this application.

In the drawings.

Corresponding and like parts are referred to in the following description and indicated in all the views of the drawings by the same reference characters.

Figure 1:
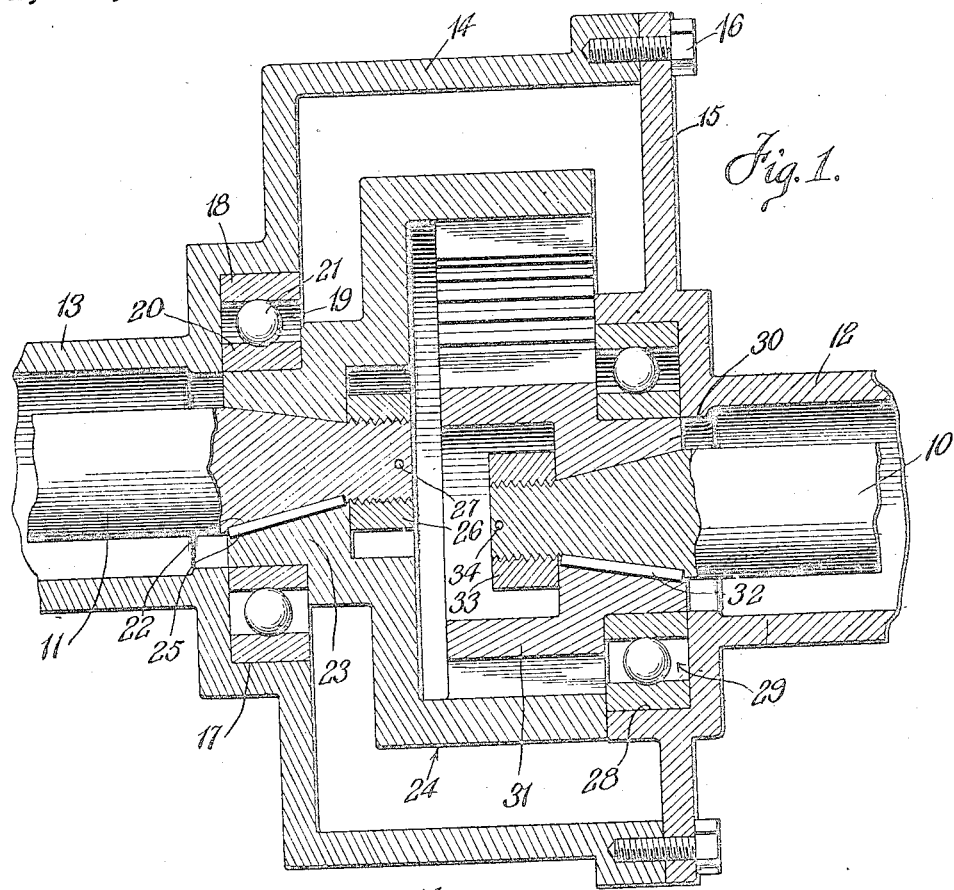
Figure 1 is a central longitudinal section through one form of my invention.

As a rule, in automobile practice, power is transmitted to the rear axle by means of a drive shaft formed in one or more sections and inclosed in a suitable tubular housing. For the sake of clearness, I have illustrated my gearing as employed in connection with a two section drive shaft mounted in a two-part housing. The shaft sections are indicated at 10 and 11 and are suitably journaled in bearings, not shown, in the tubular housings 12 and 13. One of these tubular housings, in the present instance the housing 13, is enlarged to provide a cylindrical casing or housing 14 at its end and the other tubular housing 12 is formed at its end with a peripheral flange providing a cap plate or closure 15 for the housing or casing 14, bolts 16 being threaded through this cap plate and into the thickened edge portion of the casing 14. The tubular housing 13, at its point of juncture with the casing portion 14, is enlarged to provide an annular chamber 17 to seat the outer ring 18 of a ball bearing race 19 which includes the outer ring and an inner ring 20 between which are disposed a plurality of ball bearings 21.

The shaft section 11 extends within the casing 14 and is formed adjacent its end with a tapered portion 22 to seat within the hub 23 of an internal gear 24 to which it is locked by a key 25. Beyond this tapered portion, the shaft section 11 is screw threaded to receive a nut 26 which is locked in place by a pin 27 in order to prevent displacement of the internal gear from the shaft section 11. The hub 23 of the internal gear carries the inner ring 20 of the bearing race 19 and the race, therefore, serves to journal the internal gear.

While the tubular housing 13 extends concentrically with respect to the casing 14, the tubular housing 12 is offset or eccentrically disposed with respect to the face plate 15 and, consequently, with respect to the casing 14. This face plate 15 is formed with an annular chamber or recess 28 to receive a ball bearing race 29 corresponding to the bearing race 19 and forming a journal for the hub 30 of a pinion 31 which meshes with the internal gear 24. This pinion is fixed upon the tapered end of the shaft section 10 by a key 32 and nut 33 locked by a pin 34. That face of the pinion 31 opposite its hub is formed with a cylindrical recess to seat the nut 33 in order that the gear and pinion may be formed with coextensive teeth and so economize in space.

Figure 2:
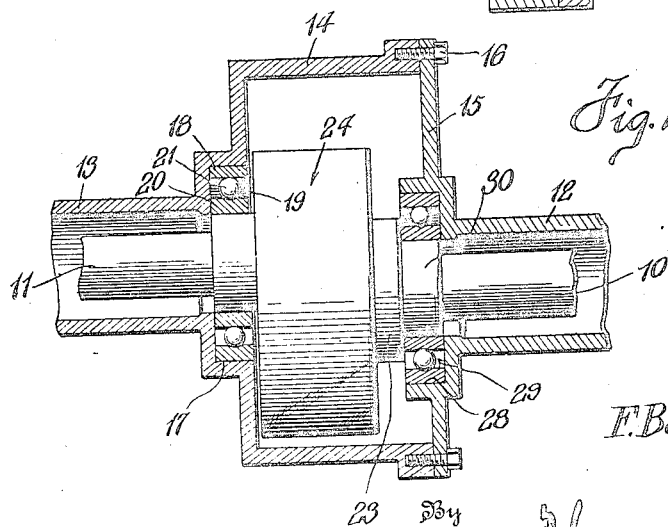
Fig. 2 is a similar view, showing the gears in elevation.

Assuming that power is being transmitted from the shaft section 10 to the shaft section 11, it will be clear that the latter shaft section will be driven at a diminished rate. It will, however, be apparent that the internal gear and pinion may be removed from the shaft sections and applied reversely in the manner shown in Fig. 2, in which the internal gear is fixed upon the shaft section 10 and the pinion upon the shaft section 11. Under these circumstances, the shaft section 11 will be driven at a higher rate of speed than the shaft section 10. It will, therefore, be clear that with my gearing applied, the owner may either step up or step down the gear ratio of his vehicle as he prefers, according to the use to which the vehicle is to be put. For this reason, the bearing races are of the same size and the ends of the shaft sections and hubs of the internal gear and pinion are so proportioned that the gear and pinion may be readily interchanged.

Having thus described my invention, what is claimed as new is:

1. In a gearing, the combination with two shaft sections, of tubular housings inclosing the sections and formed with enlargements providing a casing about adjacent ends of the sections, and gear elements secured to the ends of the sections and meshing with each other, the gear elements being interchangeable from one section to the other.

2. In a gearing, the combination with two shaft sections, of tubular housings inclosing the shaft sections, one of the housings being formed with an enlargement providing a cylindrical casing open at one end and the other with an enlargement forming a cover plate for the casing, both enlargements being formed to provide annular chambers surrounding the shaft sections, bearing races mounted in the chambers, and interchangeable gear elements mounted upon the shaft sections and journaled by the bearing races.

3. In a gearing, the combination with two shaft sections, of tubular housings inclosing the shaft sections, one of the housings being formed with an enlargement providing a cylindrical casing open at one end and the other with an enlargement forming a cover plate for the casing, both enlargements being formed to provide annular chambers surrounding the shaft sections, bearing races mounted in the chambers, and interchangeable gear elements mounted upon the shaft sections and journaled by the bearing races, said gear elements including an internal gear having a hub journaled by a bearing race and adapted for attachment to one shaft section, and a pinion having a hub journaled by the other bearing race and adapted for attachment to a shaft section.

In testimony whereof I affix my signature.

FRANK BANKS. [L. S.]